(12) United States Patent
Gabe

(10) Patent No.: US 8,982,393 B2
(45) Date of Patent: Mar. 17, 2015

(54) PRINTING APPARATUS AND PRINTING METHOD

(71) Applicant: Canon Kabushiki Kaisha, Tokyo (JP)

(72) Inventor: Hanae Gabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/957,042

(22) Filed: Aug. 1, 2013

(65) Prior Publication Data

US 2014/0055815 A1 Feb. 27, 2014

(30) Foreign Application Priority Data

Aug. 22, 2012 (JP) ................. 2012-183584

(51) Int. Cl.
| | |
|---|---|
| G06F 15/00 | (2006.01) |
| H04N 1/00 | (2006.01) |
| H04N 1/23 | (2006.01) |
| G06K 15/00 | (2006.01) |

(52) U.S. Cl.
CPC ....... *H04N 1/00668* (2013.01); *H04N 1/00408* (2013.01); *H04N 1/00482* (2013.01); *H04N 1/00623* (2013.01); *H04N 1/2323* (2013.01); *H04N 1/2338* (2013.01); *H04N 1/2369* (2013.01); *G06K 15/4065* (2013.01); *H04N 2201/33321* (2013.01); *H04N 2201/0094* (2013.01)
USPC .......................................................... 358/1.15

(58) Field of Classification Search
CPC .................................................. H04N 1/00668
USPC .......................................................... 358/1.15
See application file for complete search history.

(56) References Cited

U.S. PATENT DOCUMENTS

| | | | | |
|---|---|---|---|---|
| 2006/0092450 | A1* | 5/2006 | Kanazawa et al. ........... | 358/1.13 |
| 2009/0185846 | A1* | 7/2009 | Okamoto ...................... | 399/388 |

FOREIGN PATENT DOCUMENTS

JP         11-52799 A         2/1999

* cited by examiner

*Primary Examiner* — Saeid Ebrahimi Dehkordy
(74) *Attorney, Agent, or Firm* — Fitzpatrick, Cella, Harper & Scinto

(57) ABSTRACT

When an instruction of printing on a mixture of printing paper sheets fed from a cassette tray which stores the printing paper sheets, and printing paper sheets fed from a manual feed tray is accepted, a paper size set for the manual feed tray is specified based on that set for the cassette tray. The specified paper size is set for the manual feed tray, and printing is performed on the mixture of printing paper sheets fed from the cassette tray, and printing paper sheets fed from a manual feed tray for which a paper size is set.

9 Claims, 20 Drawing Sheets

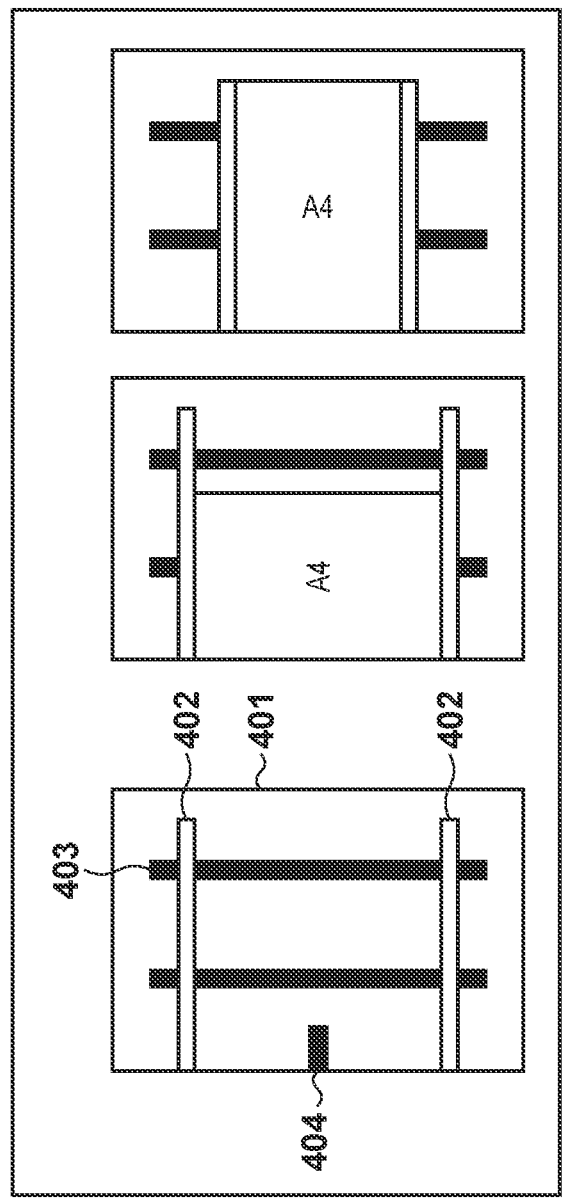

F I G. 5C

<MANUAL FEED PAPER CHANGE RESERVATION: PAPER TYPE>
PAPER TYPE CAN BE SELECTED

| THIN PAPER ☐ (60~64g/m2) | PLAIN PAPER ☐ | THICK PAPER 1 [T] (106~120g/m2) |
|---|---|---|
| THICK PAPER 2 [T] (121~163g/m2) | THICK PAPER 3 [T] (164~220g/m2) | COLORED PAPER ☐ (64~82g/m2) |
| RECYCLED PAPER [R] | PUNCHED PAPER ☐ | OHP FILM ☐ |
| ORIGINAL DRAWING ☐ | LABELED PAPER ☑ | |

▷ TO DETAILED SETTINGS    ▷ BASIS WEIGHT SETTING OF PLAIN PAPER    SECOND SURFACE OF DOUBLE-SIDED PAPER

✕ CANCEL SETTINGS    ◁ RETURN    OK ↵

507
508

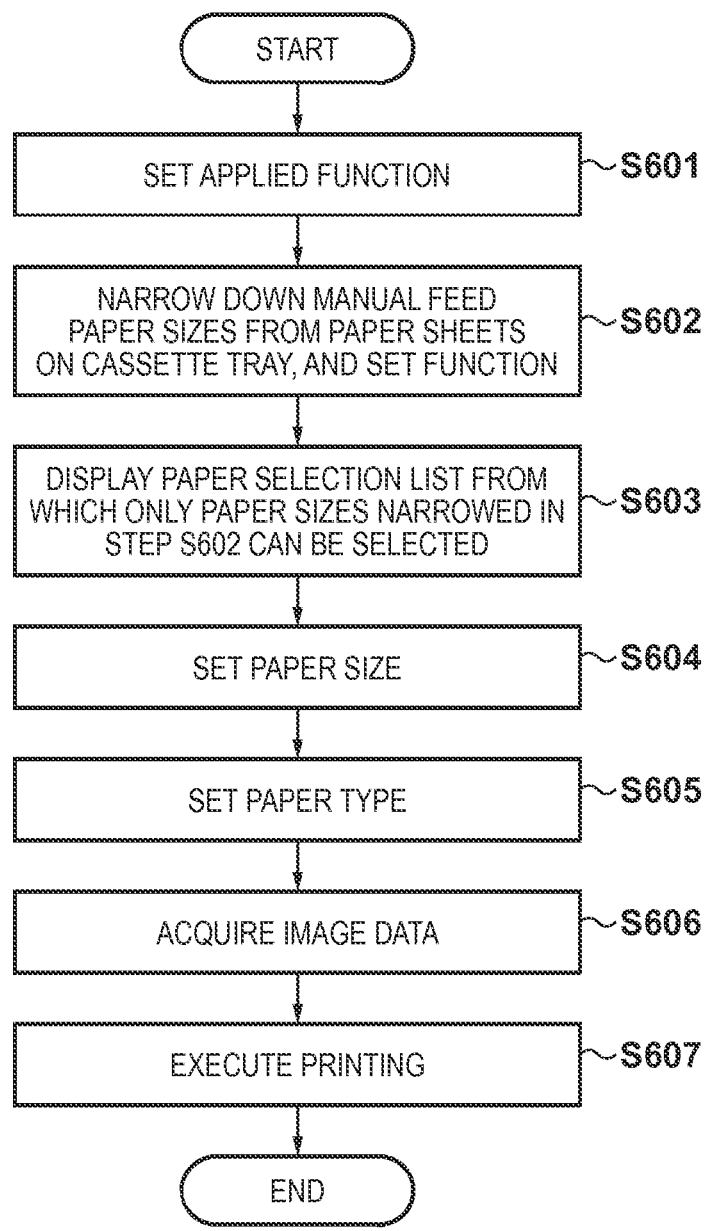

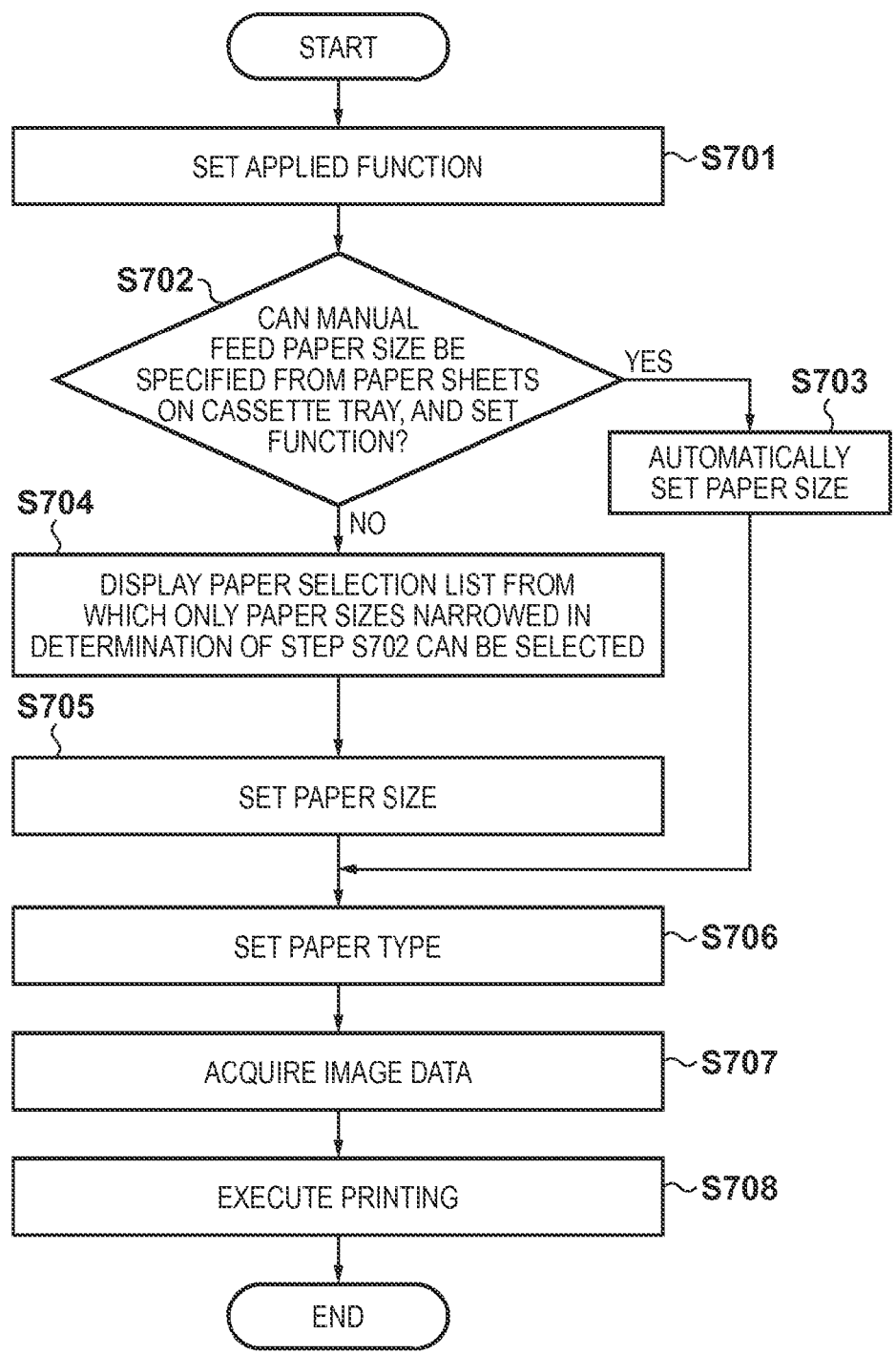

FIG. 17A

<MANUAL FEED PAPER CHANGE: PAPER SIZE>
PAPER SIZE CAN BE SELECTED

- A/B SIZE
  - A4
  - A5
  - B5
  - OTHERS ~1705
- USER SETTING SIZE ▷
- ▷ TO INCH SIZE
- × CANCEL SETTINGS    ◀ RETURN    NEXT ▷

<MANUAL FEED PAPER CHANGE: PAPER SIZE>
PAPER SIZE CAN BE SELECTED

- A/B SIZE
  - A4 R
  - A5 R
  - OTHERS ~1705
- USER SETTING SIZE ▷
- ▷ TO INCH SIZE
- × CANCEL SETTINGS    ◀ RETURN    NEXT ▷

~1703
~1704

F I G. 18
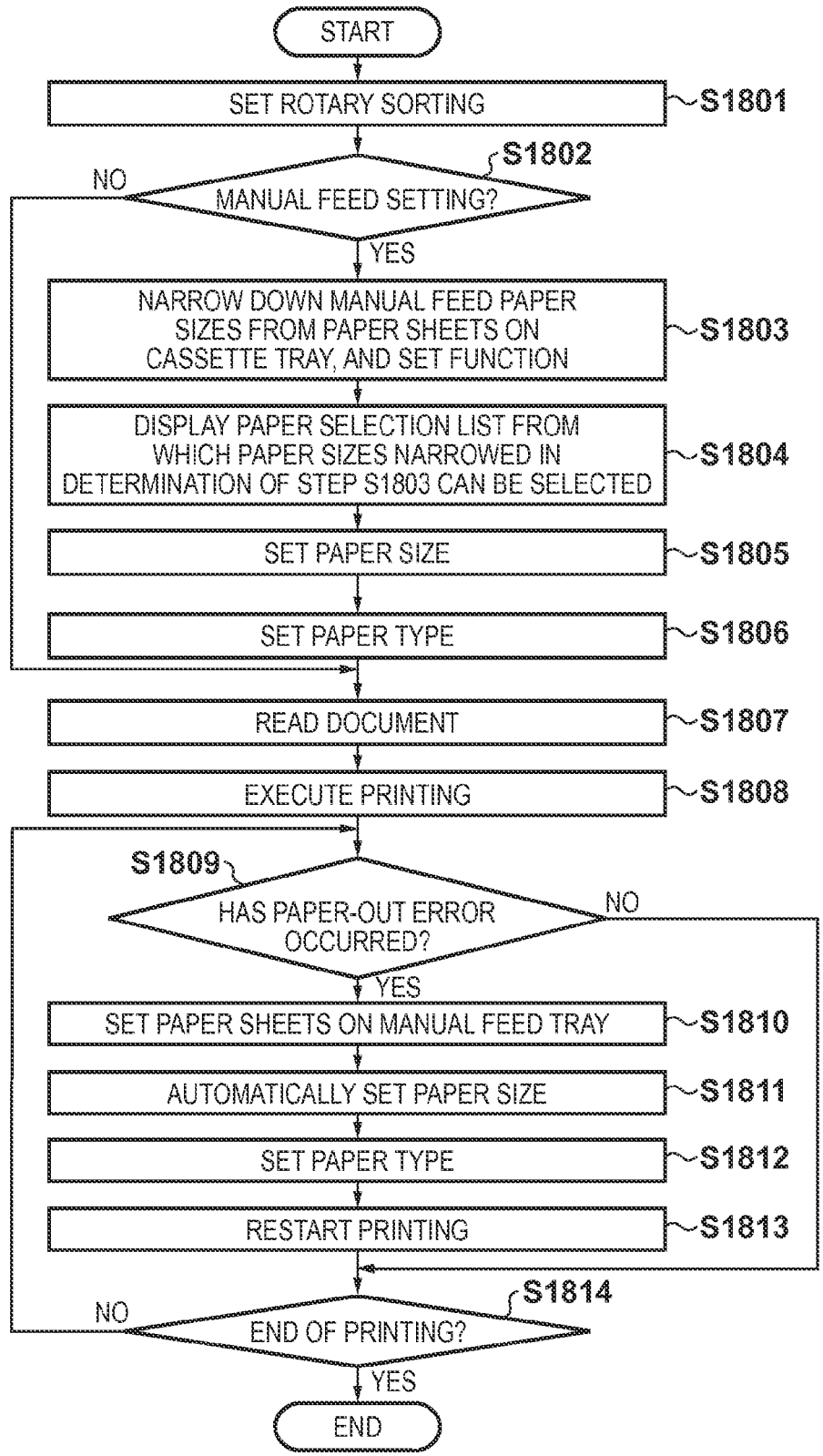

PRINTING APPARATUS AND PRINTING METHOD

BACKGROUND OF THE INVENTION

1. Field of the Invention

The present invention relates to a printing apparatus and printing method which can feed paper sheets from a manual feed tray.

2. Description of the Related Art

An image forming apparatus such as a copying machine or a printer is often provided with not only a cassette tray but also a manual feed tray as a paper feed unit which feeds paper sheets. The user can use this manual feed tray to easily print on a variety of paper sheets. However, this requires a setting operation for allowing the image forming apparatus to recognize a paper size to be set for the manual feed tray. Unless this setting operation is performed appropriately, a paper sheet cannot be printed appropriately (a so-called miscopy). If, for example, the set paper size is different from the set document size, a detection error is generated in the paper length, resulting in the occurrence of a paper jam. Japanese Patent Laid-Open No. 11-52799 describes a method of image formation corresponding to the size of manual feed paper.

For example, as a method of designating the paper size of the manual feed tray in copying, a method of making the user designate the manual feed paper size used from a plurality of paper size keys provided on an operation panel is available. However, in this method, all paper sizes supported by the image forming apparatus are displayed on the operation panel as paper size keys, so a large number of options for the paper size are used, thus degrading the user convenience.

SUMMARY OF THE INVENTION

An aspect of the present invention is to eliminate the above-mentioned problems with the conventional technology. The present invention provides a printing apparatus and printing method which improve the convenience in setting a paper size for a manual feed tray in printing which uses the manual feed tray.

The present invention in its first aspect provides a printing apparatus including a manual feed tray capable of feeding printing paper sheets with a plurality of paper sizes, and a cassette tray, the apparatus comprising: an instruction accepting unit configured to accept an instruction of printing on a mixture of a printing paper sheet fed from the cassette tray which stores the printing paper sheet, and a printing paper sheet fed from the manual feed tray; a specifying unit configured to specify the paper size set for the manual feed tray, based on the paper size set for the cassette tray, in a case where the instruction is accepted by the instruction accepting unit; and a setting unit configured to set, for the manual feed tray, the paper size specified by the specifying unit; and a printing unit configured to perform printing on a mixture of a printing paper sheet fed from the cassette tray, and a printing paper sheet fed from the manual feed tray for which the paper size is set by the setting unit.

According to the present invention, it is possible to improve the convenience in setting a paper size for a manual feed tray in printing which uses the manual feed tray.

Further features of the present invention will become apparent from the following description of exemplary embodiments with reference to the attached drawings.

BRIEF DESCRIPTION OF THE DRAWINGS

FIG. 4 shows views of a manual feed tray, shown in FIG. 3, as viewed from above;

FIGS. 5A to 5C are views showing setting screens for setting paper sheets to be set on the manual feed tray;

FIG. 6 is a flowchart showing the procedure of processing of executing an applied function using the manual feed tray;

FIG. 7 is a flowchart showing the procedure of another processing of executing the applied function using the manual feed tray;

FIGS. 17A and 17B are views showing screens for displaying paper selection lists;

FIG. 18 is a flowchart showing the procedure of processing of specifying a manual feed paper size in the third embodiment;

DESCRIPTION OF THE EMBODIMENTS

Figure 1:
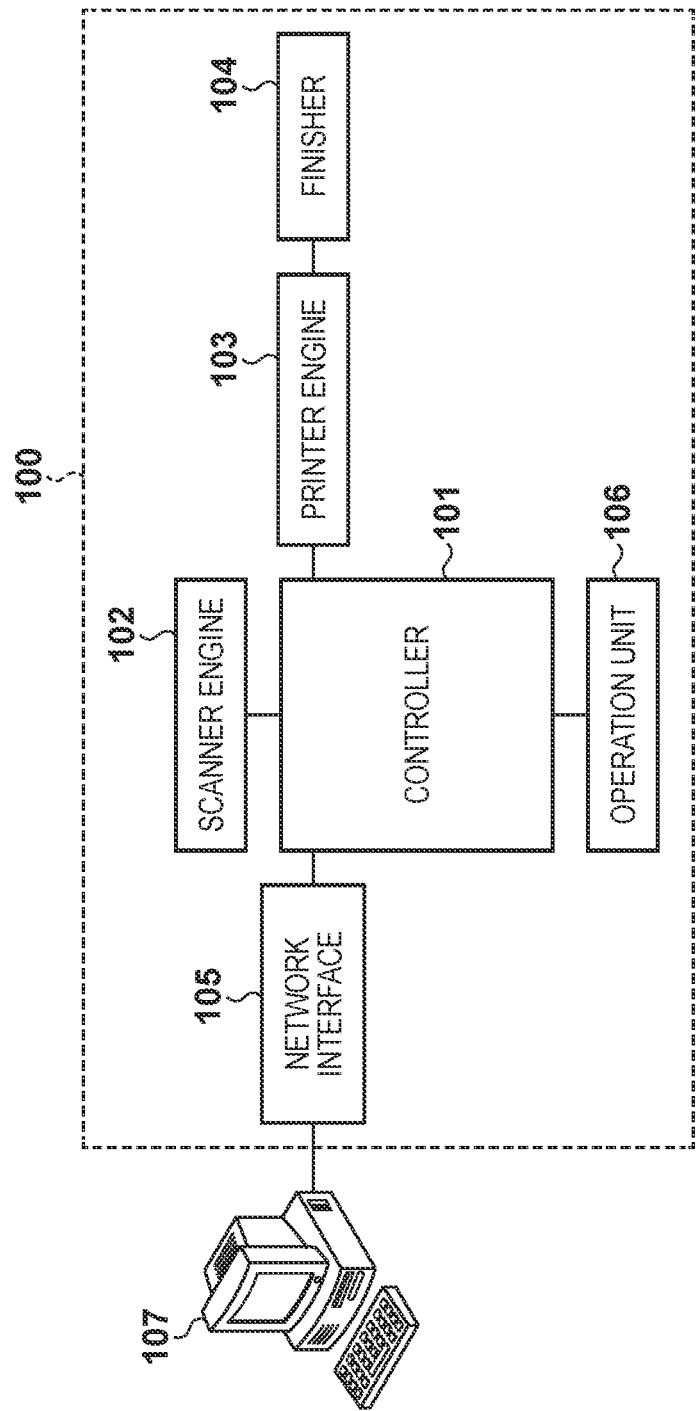
FIG. 1 is a block diagram showing a block configuration in which attention is focused on the function of an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same constituent elements, and a description thereof will not be given.

[First Embodiment]
[Apparatus Overview]

FIG. 1 is a block diagram showing a block configuration in which attention is focused on the function of an image forming apparatus 100 (to be also referred to as a printing apparatus hereinafter) in an embodiment according to the present invention. An MFP (Multi-Function Peripheral) which integrates, for example, a printing function, a scanner function, and a facsimile function is used as the image forming apparatus 100. The image forming apparatus 100 includes a controller 101, scanner engine 102, printer engine 103, finisher 104, network interface 105, and operation unit 106, as shown in FIG. 1. The controller 101 includes a CPU, and a storage area such as a ROM or a RAM, and controls the overall image forming apparatus 100. Processing of each flowchart, and each function of the image forming apparatus 100 (both will be described later) are implemented by making the CPU expand a program stored in, for example, the ROM into the RAM, and execute it. The scanner engine 102 implements a scan function under the control of the controller 101. The scanner engine 102 is, for example, a line sensor which optically reads a document set (placed) on a document table, or a document conveyance mechanism in skim-through reading.

The printer engine 103 implements a print function under the control of the controller 101. The printer engine 103 is, for example, a photosensitive drum irradiated with a laser beam in the laser beam printing scheme. However, the printer engine 103 is, for example, a printhead in the inkjet printing scheme. The finisher 104 is connected to the output of the printer engine 103, and performs, for example, staple processing by bundling a plurality of printing media (for example, printing paper sheets) printed by the printer engine 103, or folding processing for each printing medium, under the control of the controller 101. The network interface 105 is, for example, an interface compatible with the Ethernet®, and allows the controller 101 to perform bidirectional communication via a network. The controller 101 can mutually communicate with a PC 107 via the network interface 105. The operation unit 106 is, for example, a display such as an LCD, or a keyboard, and displays, for example, the state of the image forming apparatus 100 or accepts an execution instruction of each function by the user.

Figure 2:
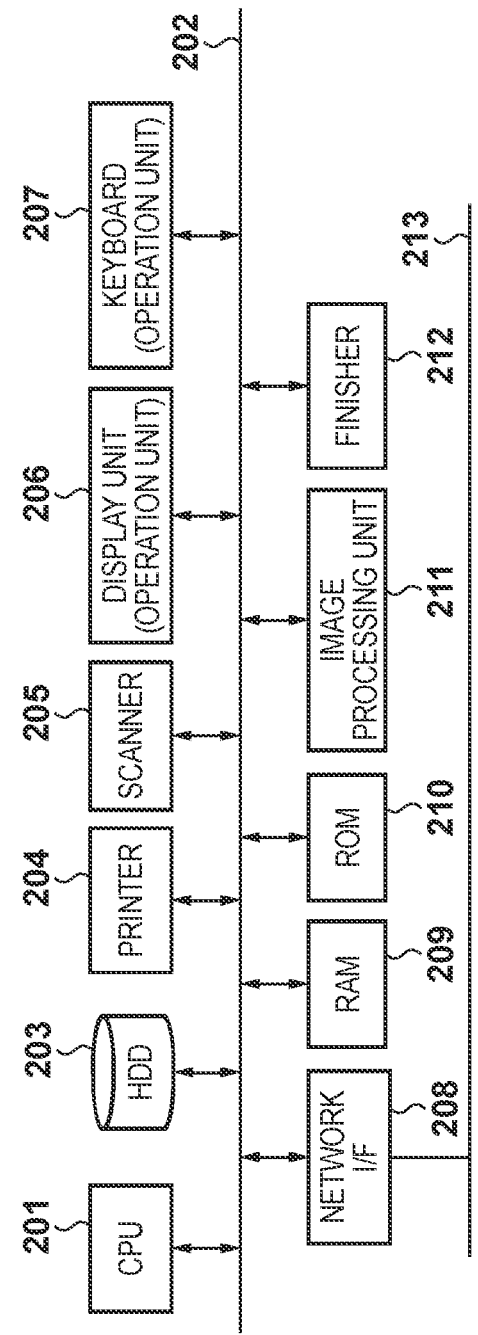
FIG. 2 is a block diagram showing a block configuration in which attention is focused on the hardware of the image forming apparatus.

FIG. 2 is a block diagram showing a block configuration in which attention is focused on the hardware of the image forming apparatus 100. FIG. 2 will be described below with reference to FIG. 1. In the controller 101, a CPU 201 controls the operation of the overall image forming apparatus 100 by loading a program stored in a ROM 210 into a RAM 209, and executing it. Also, the CPU 201 mutually communicates with a display unit 206 such as a liquid crystal display and a keyboard 207, which correspond to the operation unit 106, the RAM 209, and the ROM 210 via a bus 202. An HDD 203 is a hard disk drive, which stores various types of information input via the operation unit 106 or network interface 105.

A printer 204 corresponding to the printer engine 103 prints an image on a printing medium based on image data input via the operation unit 106 or network interface 105. A scanner 205 corresponding to the scanner engine 102 stores, in, for example, the HDD 203 or RAM 209, image data (read data) generated by optically reading a document set on the document table by the user. Also, if the scanner 205 includes a document feed device, it sequentially conveys a plurality of documents set in the document feed device to the position of reading by the sensor, and reads them.

The display unit 206 displays various types of information to be sent to the user, such as printing result information. Also, the display unit 206 has a touch panel sheet pasted on its liquid crystal, and displays a system operation screen and soft keys. Also, when a key displayed on the display unit 206 is pressed by the user, the display unit 206 transmits the information of the key to the CPU 201. The keyboard 207 accepts execution instructions of various functions by the user. A network interface 208 connects the image forming apparatus 100 to a network 213, and transmits/receives data to/from the PC 107 on the network 213. An image processing unit 211 executes various types of image processing such as scaling or color conversion for the image data stored in the RAM 209.

Figure 3:
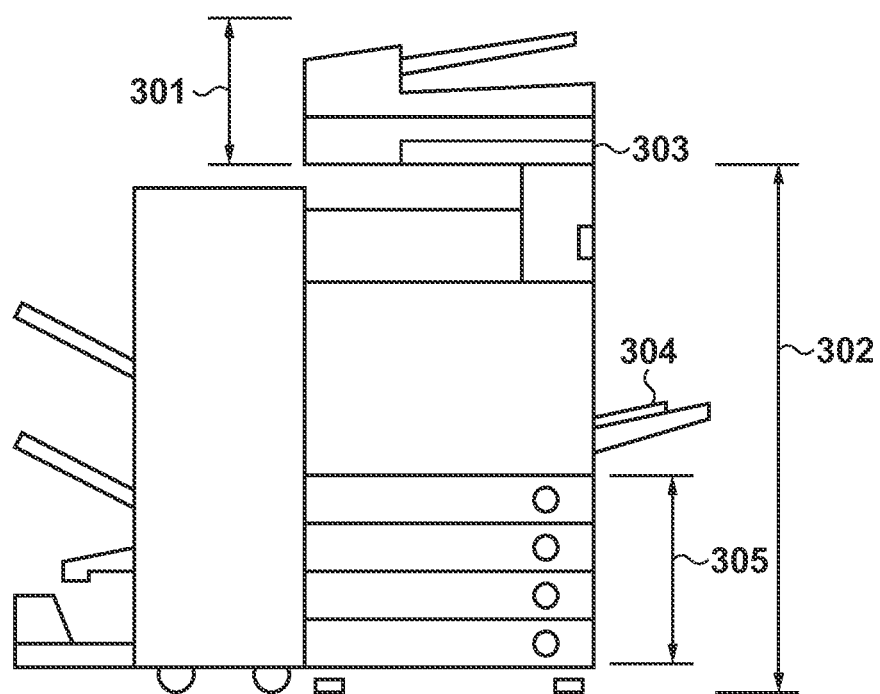
FIG. 3 is a view showing the outer appearance of the image forming apparatus.

FIG. 3 is a view showing the outer appearance of the image forming apparatus 100. A scanner unit 301 irradiates the surface of a document with light, and receives the light reflected by it using a CCD line sensor to obtain electrical image data. The CPU 201 can perform document color determination or size determination based on the obtained electrical image data. A printer unit 302 prints an image on a printing medium based on the image data. In a copy function, the printer unit 302 prints an image based on the image data obtained by the scanner unit 301. The printer unit 302 can also perform staple processing or folding processing such as bookbinding after printing. The CPU 201 controls the start and stop of a printing operation. An operation unit 303 includes the display unit 206 and keyboard 207. A manual feed tray 304 can feed printing paper sheets with a plurality of sizes, and the user sets printing paper sheets with a desired size. A cassette tray 305 stores printing paper sheets with each size set in advance, such as A4 or A3 size.

FIG. 4 shows views of the manual feed tray 304, shown in FIG. 3, as viewed from above. A manual feed tray 401 (corresponding to the manual feed tray 304) shown in FIG. 4 has guides 402 movable on rails 403. The user can adjust the position of the guides 402 in accordance with the paper size to be set. If, for example, the user places paper sheets with A4 size in a portrait mode, he or she adjusts the position of the guides 402, as shown in FIG. 4. However, if, for example, the user places paper sheets with A4 size in a landscape mode, he or she adjusts the position of the guides 402, as shown in FIG. 4. A sensor 404 is, for example, an optical sensor, and detects that paper sheets are set. When the user sets paper sheets, this means that paper sheets are positioned on the sensor 404, and the controller 101 detects that paper sheets are set on the manual feed tray 401.

[Paper Size Setting Screen]

Figure 5A:
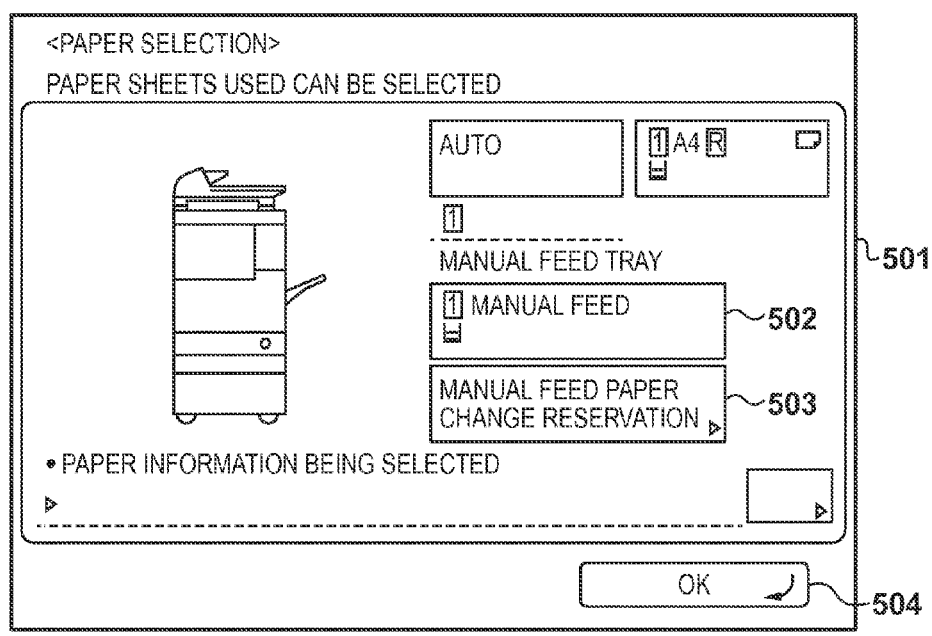
Figure 5B:
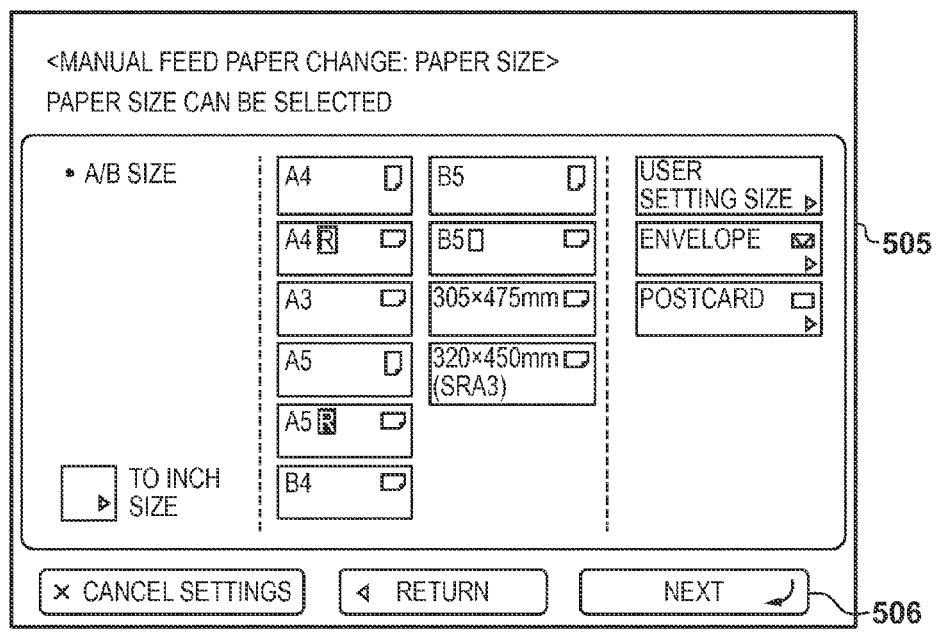

FIGS. 5A to 5C are views showing setting screens for setting a paper size and paper type to be set for the manual feed tray 304. The setting screens shown in FIGS. 5A to 5C are displayed on the display unit 206. When the user presses a manual feed key 502 or a manual feed paper change reservation key 503 on a paper selection screen 501 shown in FIG. 5A, a paper size selection screen 505 shown in FIG. 5B is displayed. The user can select a paper size to be set for the manual feed tray 304 from a plurality of paper sizes on a list displayed on the paper size selection screen 505. The contents displayed on the paper size selection screen 505 will be described in each embodiment. When the user selects a desired paper size from a button group indicating usable paper sizes displayed on the paper size selection screen 505, and presses a "Next" button 506, a paper type change screen 507 shown in FIG. 5C is displayed. When the user selects a desired paper type from a button group indicating usable paper types displayed on the paper type change screen 507, and presses an "OK" button 508, a return to the display of the paper selection screen 501 is made. Further, when the user presses an "OK" button 504, this setting processing ends.

In each of the following embodiments, when a specific applied function of the image forming apparatus 100 is executed, paper sizes that can be displayed on the paper size selection screen 505 are narrowed down and displayed, based on the paper size already set for the cassette tray 305, and the settings of the applied function. As a result, only a paper size necessary to execute the applied function is displayed in consideration of the paper size already set for the cassette tray 305, so the efficiency of selecting a paper size to be set for the manual feed tray 304 by the user can be improved. Note that the applied function is, for example, a mixed LTR (letter)/ LGL (legal) function. The mixed LTR/LGL function is as follows. First, the image forming apparatus 100 uses the scanner unit 301 to read a bundle of documents as a mixture of documents with LTR and LGL sizes at once from a feeder (DF) of the scanner unit 301. The image forming apparatus 100 then performs print output of each page with a paper size equal to the document size detected by the scanner unit 301. In general, LTR size is 215.9 mm×279.4 mm, and LGL size is 215.9 mm×355.6 mm.

[Paper Size Setting of Manual Feed Tray]

FIG. 6 is a flowchart showing the overview of the procedure of processing of executing an applied function, set in the image forming apparatus 100 by the user, using the manual feed tray 304. The flowchart shown in FIG. 6 is common to each example (to be described later). Each type of processing shown in FIG. 6 is executed by, for example, the CPU 201. In step S601, the CPU 201 accepts the settings of an applied function by the user via the display unit 206 or PC 107. Note that, for example, possible/impossible of the use of the manual feed tray 304 in setting the mixed LTR/LGL function is accepted. In step S602, the CPU 201 narrows down paper sizes, that can be used for the manual feed tray 304, of all paper sizes that can be used in the image forming apparatus 100, from the paper size already set for the cassette tray 305, and the settings of the applied function set in step S601. An example of the narrowing method will be described with reference to FIGS. 9 and 15. In step S603, the CPU 201 displays a list of paper sizes specified in step S602 as the paper size selection screen 505 shown in FIG. 5B. In step S604, the CPU 201 accepts the paper size selected by the user on the paper size selection screen 505, and sets it for the manual feed tray 304. In step S605, the CPU 201 sets, for the manual feed tray 304, the paper type selected by the user on the paper type change screen 507 displayed next. In step S606, the CPU 201 acquires image data from the scanner 205 or PC 107. In step S607, the CPU 201 uses the printer 204 to print based on the acquired image data. In this printing, paper sheets set on the manual feed tray 304 or cassette tray 305 are used.

In the above description, after usable paper sizes are narrowed down in step S602, the user always designates a paper size on the paper size selection screen 505. However, when the paper sizes can be narrowed down to one specific paper size in step S602, the narrowed paper size may be automatically set for the manual feed tray 304 without a user selection instruction. Processing in this case will be described with reference to FIG. 7.

In step S701 of FIG. 7, as in step S601, the CPU 201 accepts the settings of an applied function by the user via the display unit 206 or PC 107. In step S702, the CPU 201 narrows down paper sizes, that can be used for the manual feed tray 304, of all paper sizes that can be used in the image forming apparatus 100, from the paper size already set for the cassette tray 305, and the settings of the applied function set in step S701. At this time, the CPU 201 determines whether the paper sizes can be narrowed down to one specific size. If the CPU 201 determines that the paper sizes can be narrowed down to one specific size, it advances the process to step S703; otherwise, it advances the process to step S704. In step S703, the CPU 201 sets one specific size narrowed in step S702 for the manual feed tray 304. At this time, one specified size is displayed to be recognizable by the user. Steps S704 to S708 are the same as in steps S603 to S607, respectively, of FIG. 6.

[Example of Image Forming Apparatus Including One Cassette Tray and Manual Feed Tray]

Each practical example will be described below. First, processing of narrowing down manual feed paper sizes when the mixed LTR (letter)/LGL (legal) function is set in the image forming apparatus 100 including the one cassette tray 305 and manual feed tray 304 will be described with reference to FIGS. 8 and 9.

Figure 9:
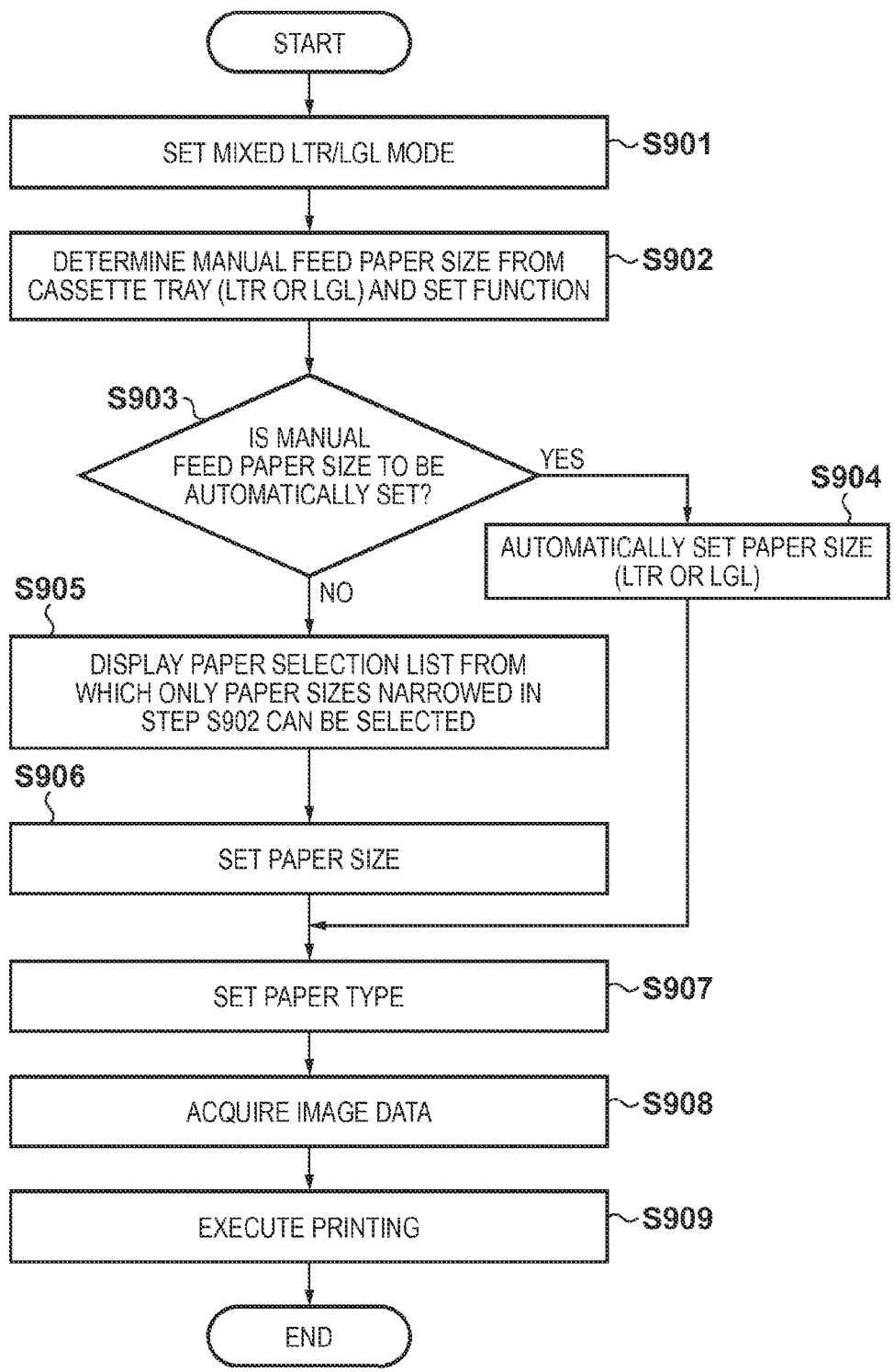
FIG. 9 is a flowchart showing the procedure of processing of specifying a manual feed paper size in the first embodiment.
Figure 12:
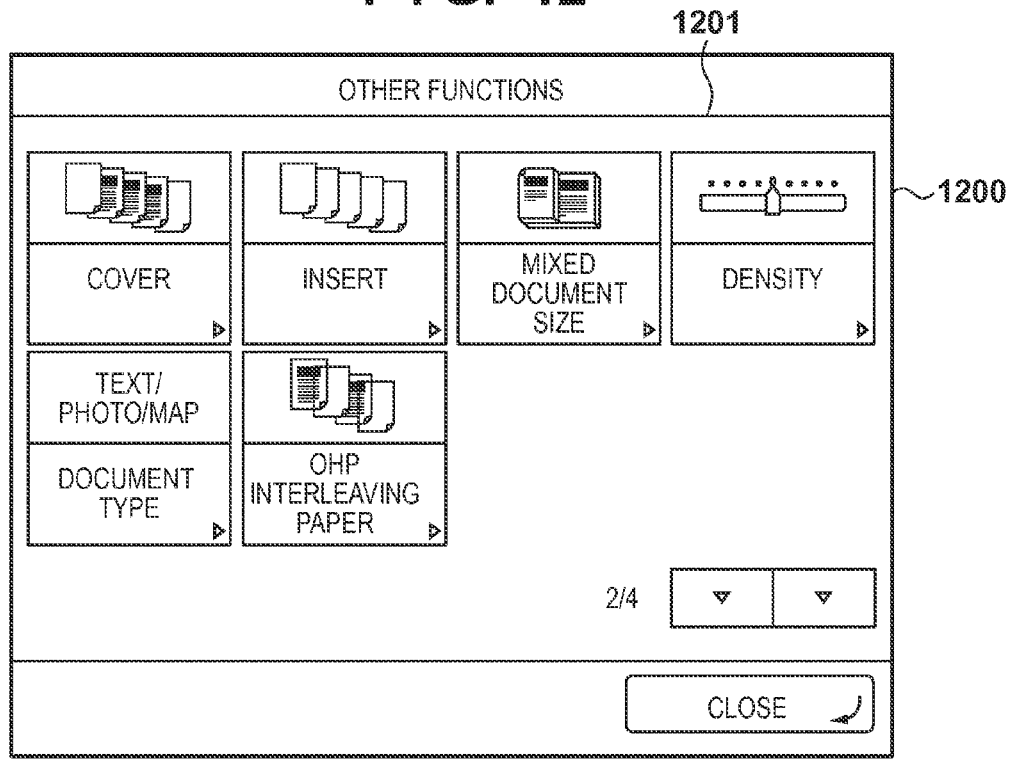
FIG. 12 is a view showing a setting screen for a mixed document size function.
Figure 13:
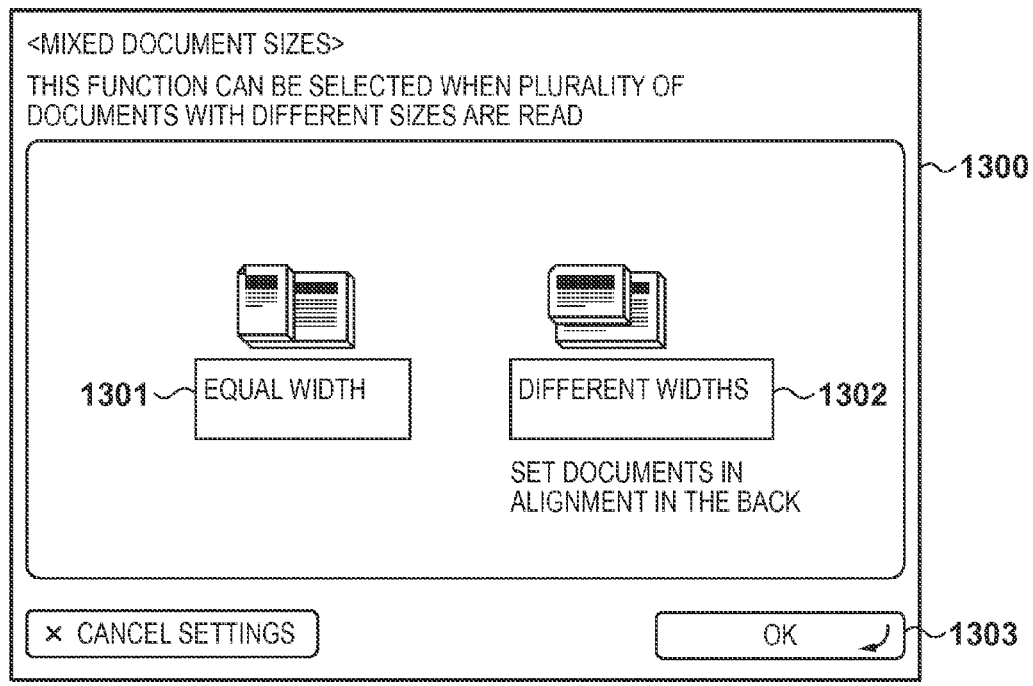
FIG. 13 is a view showing a detailed setting screen for the mixed document size function.

FIG. 9 is a flowchart showing the procedure of processing of narrowing down manual feed paper sizes when documents with LTR or LGL size are set for the cassette tray 305. The processing shown in FIG. 9 is executed by, for example, the CPU 201. In step S901, the CPU 201 accepts the settings of the mixed LTR/LGL function by the user via the display unit 206 or PC 107. An example of step S901 will be described herein. The user presses a mixed document size button 1201 on a setting screen 1200 of a copy function, as shown in FIG. 12. The setting screen 1200 is a detailed setting screen for the general copy function displayed on a display in, for example, an MFP. When the mixed document size button 1201 is pressed, a setting screen 1300 for a mixed document size function shown in FIG. 13 is further displayed. On the setting screen 1300, the user selects whether the widths of documents placed on the document table are equal or different. As the user selects a button 1301 or 1302, and presses an "OK" button 1303, the CPU 201 can accept the settings of the mixed LTR/LGL function. Note that possible/impossible of the use of the manual feed tray 304 may be set via, for example, a button on the setting screen 1300. In the following description, the use of the manual feed tray 304 is assumed to be set.

In step S902, the CPU 201 narrows down and specifies a paper size (LTR or LGL size), that can be used for the manual feed tray 304, from the paper size already set for the cassette tray 305, and the acceptance result of the settings of the mixed LTR/LGL function in step S901. If, for example, the CPU 201 determines that paper sheets with LTR size are set on the cassette tray 305 upon acceptance of the settings of the mixed LTR/LGL function, it narrows down paper sizes that can be used for the manual feed tray 304 to LGL size, and specifies it. On the other hand, if the CPU 201 determines that paper sheets with LGL size are set on the cassette tray 305 upon acceptance of the settings of the mixed LTR/LGL function, it narrows down paper sizes that can be used for the manual feed tray 304 to LTR size, and specifies it. In step S903, the CPU 201 determines whether a setting in which a specified manual feed paper size is to be automatically set for the manual feed tray 304 without a user instruction if the manual feed paper size can be specified has been made in advance. If the CPU 201 determines that the setting is made in advance, it advances the process to step S904; otherwise, it advances the process to step S905. Note that a setting as to whether a specified manual feed paper size is to be automatically set for the manual feed tray 304 without a user instruction if the manual feed paper size can be specified can be accepted on, for example, the setting screen 1300 for the mixed LTR/LGL function.

In step S904, the CPU 201 sets the paper size specified in step S902 for the manual feed tray 304. At this time, if paper sheets with LTR size are set on the cassette tray 305, LGL size is set for the manual feed tray 304 as a paper size. However, if paper sheets with LGL size are set on the cassette tray 305, LTR size is set for the manual feed tray 304 as a manual feed paper size.

Upon advancing the process to step S905, the CPU 201 displays the paper size specified in step S902 on the display unit 206 as a selectable paper selection list. At this time, if paper sheets with LTR size are set on the cassette tray 305, the CPU 201 displays a screen 801 shown in FIG. 8A on the display unit 206. However, the CPU 201 may display not only a paper size 804 specified in step S902 but also an "Others" button 805, as in a screen 803 shown in FIG. 8C. At this time, when the user presses the "Others" button 805, a shift to a paper size list excluded from the paper selection list can be made. When the user presses a "Next" button 806 in step S905, the CPU 201 advances the process to step S906.

Figure 8A:
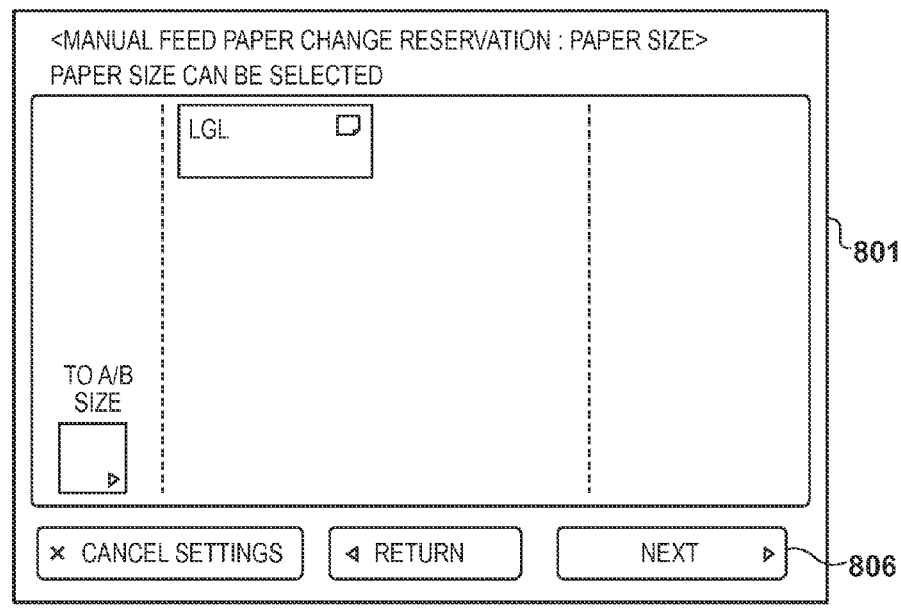
FIGS. 8A to 8D are views showing screens for displaying paper selection lists.
Figure 8B:
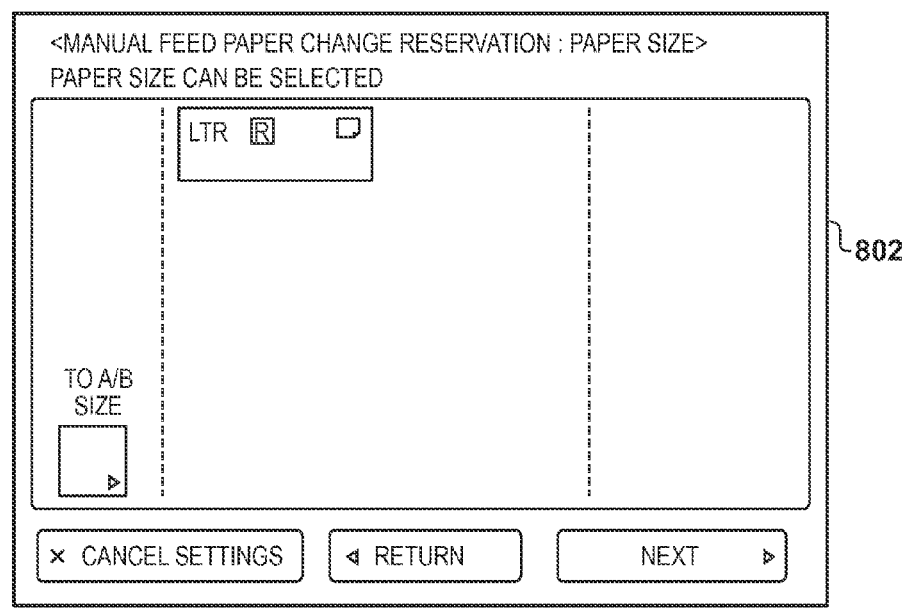
Figure 8C:
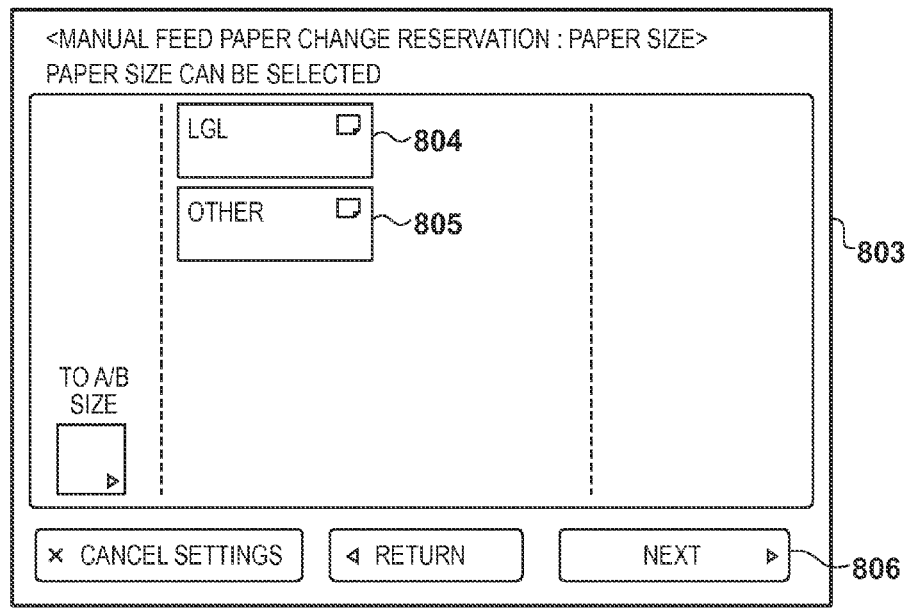
Figure 8D:
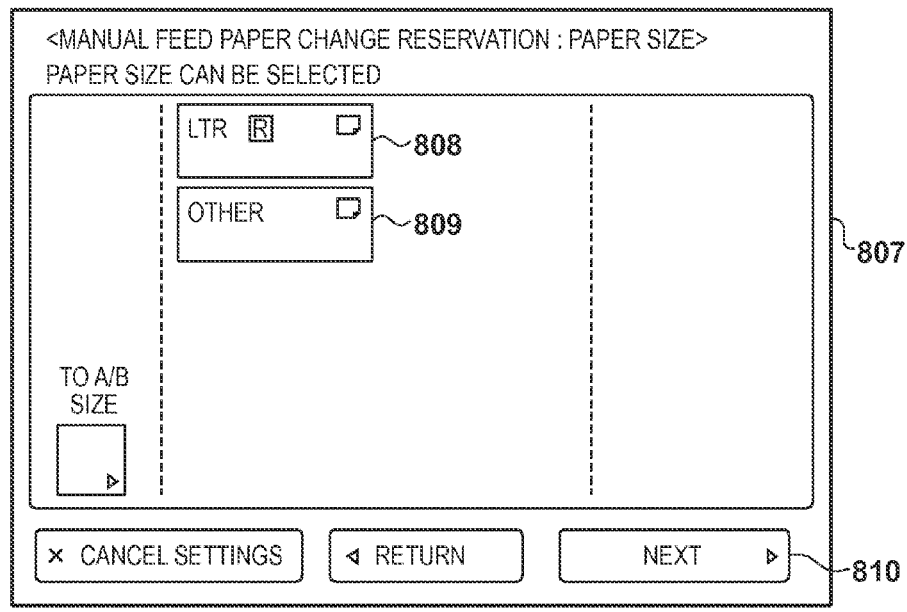

On the other hand, if paper sheets with LGL size are set on the cassette tray 305, the CPU 201 displays a screen 802 shown in FIG. 8B on the display unit 206. However, the CPU 201 may display not only a paper size 808 specified in step S902 but also an "Others" button 809, as in a screen 807 shown in FIG. 8D. At this time, when the user presses an "Others" button 809, a shift to a paper size list excluded from the paper selection list can be made.

With this operation, in step S905, the CPU 201 displays paper sheets with a size that is not set for the cassette tray 305, prioritized over paper sheets with other sizes, as a selectable paper candidate list. Note that the prioritizing method is not limited to a method of displaying only paper sheets with a size that is not set for the cassette tray 305, without displaying paper sheets with other sizes, as shown in FIGS. 8A to 8D. For example, the CPU 201 may display candidates for paper sheets with a size that is not set for the cassette tray 305, relatively larger than the paper sheets with other sizes.

In step S906, the CPU 201 displays the paper type change screen 507, and sets, for the manual feed tray 304, a paper size designated by the user from the paper selection list displayed in step S905. In step S907, the CPU 201 sets, for the manual feed tray 304, the paper type designated by the user on the paper type change screen 507. In step S908, the CPU 201 acquires image data from the scanner 205 or PC 107. In step S909, the CPU 201 uses the printer 204 to start execution of printing based on the acquired image data.

[Case wherein Paper-Out Condition Has Occurred]

Processing of setting a manual feed paper size when a paper-out error (paper-out condition) has occurred will be described below with reference to FIGS. 10A, 10B, and 11. FIG. 11 is a flowchart showing the procedure of processing of setting a manual feed paper size when a paper-out error has occurred. The processing shown in FIG. 11 is executed by, for example, the CPU 201. In step S1101, the CPU 201 accepts the settings of the mixed LTR/LGL function by the user via the display unit 206 or PC 107, as in step S901 of FIG. 9. In step S1102, the CPU 201 determines whether the use of the manual feed tray 304 is set in the settings of the mixed LTR/LGL function. This determination may be done in accordance with whether, for example, the user has designated the manual feed tray 304 on the general printing setting screen. Alternatively, this determination may be done based on the setting details of a setting menu for a tray used (not shown) on the setting screen 1300 shown in FIG. 13. If the CPU 201 determines in step S1102 that the use of the manual feed tray 304 is set, it advances the process to step S1103; otherwise, it advances the process to step S1108. The processes in steps S1103 to S1109 are the same as those in steps S702 to S708, respectively, in FIG. 7.

In step S1110, the CPU 201 determines whether a paper-out condition is set, based on whether it is detected that paper sheets with a size necessary for the mixed LTR/LGL function have run out in the cassette tray 305. If the CPU 201 determines that a paper-out condition is set, it interrupts the current printing, displays a paper-out error on the display unit 206, and advances the process to step S1111. On the other hand, if the CPU 201 determines that a paper-out condition is not set, it directly continues the printing, and advances the process to step S1115.

Figure 10A:
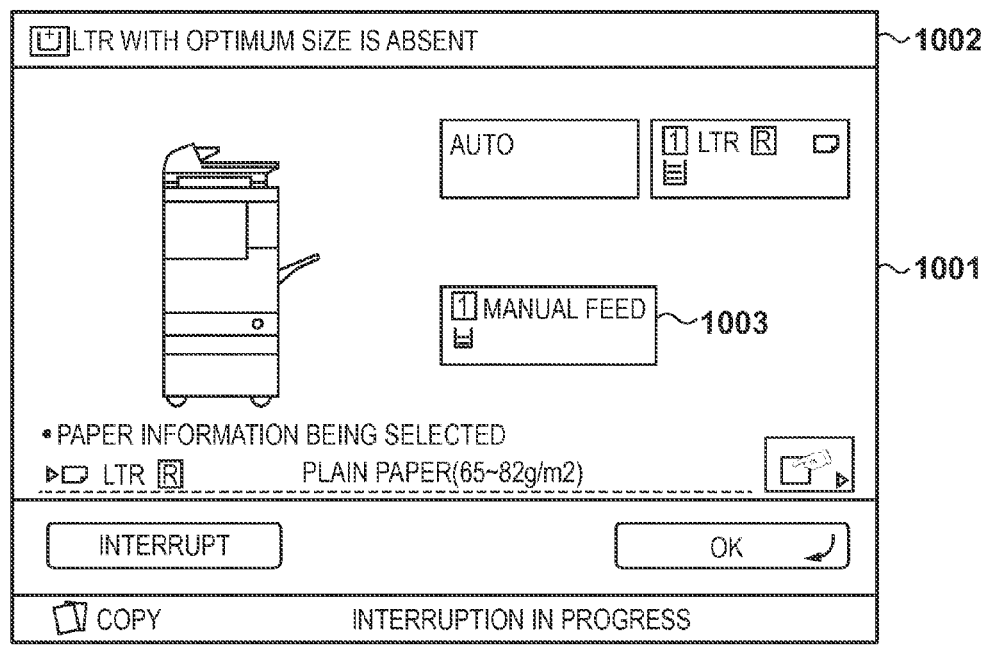
FIGS. 10A and 10B are views showing screens for displaying manual feed paper size candidates in a paper-out condition.
Figure 10B:
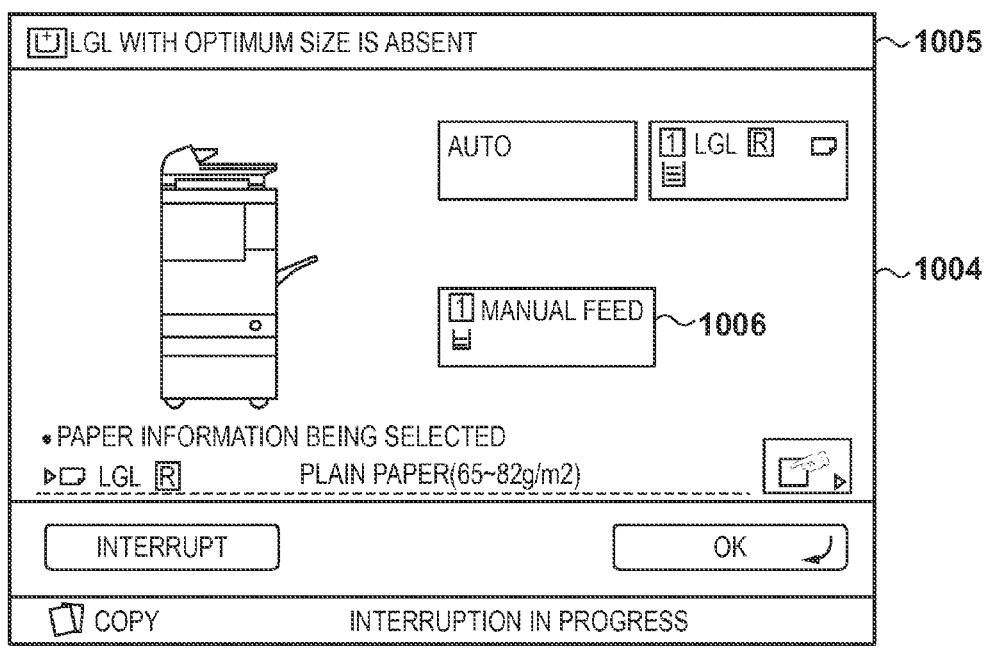
Figure 11:
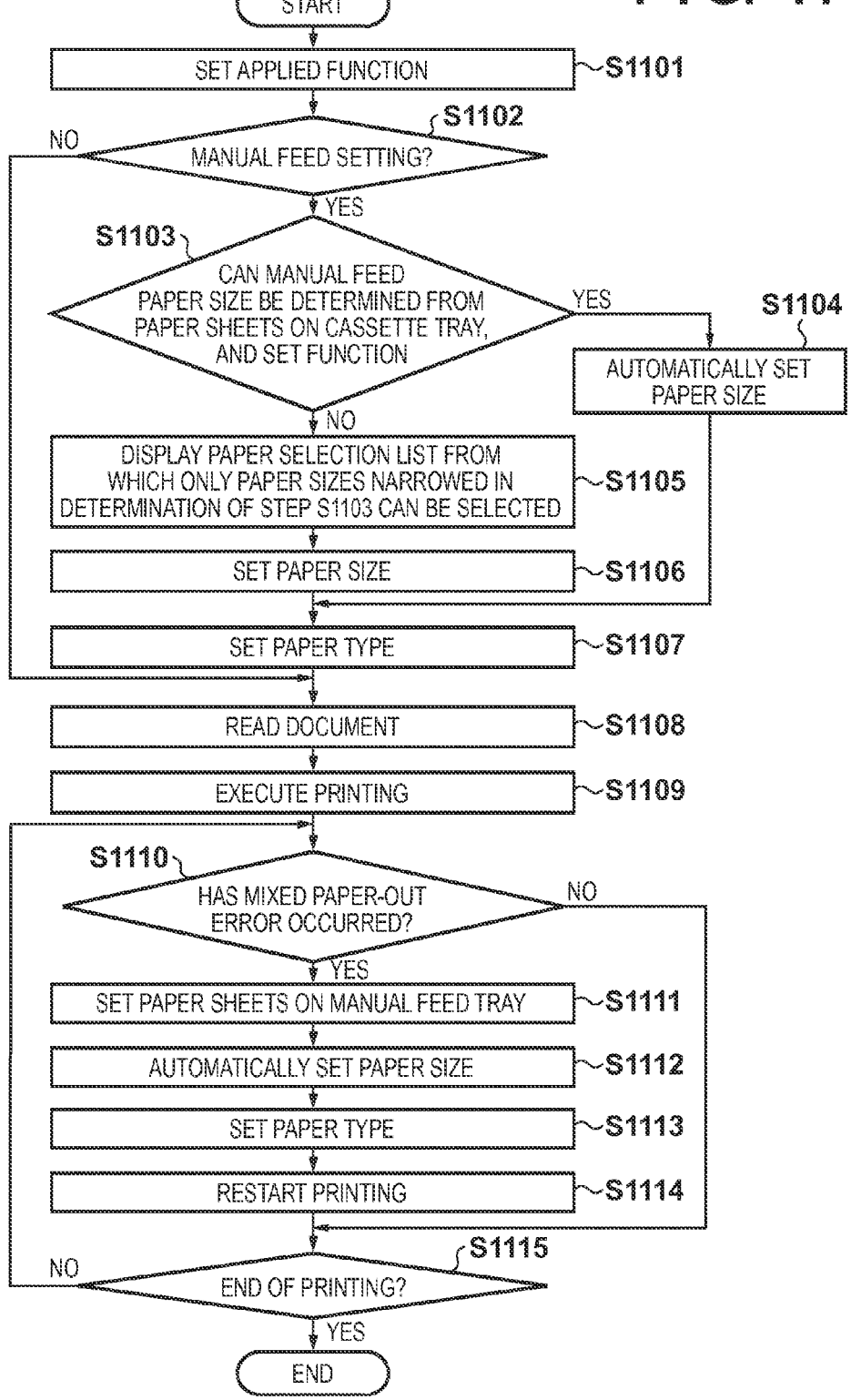
FIG. 11 is a flowchart showing the procedure of processing of specifying a manual feed paper size in a paper-out condition.

If the paper size of the cassette tray 305 determined to be in a paper-out condition in step S1110 is LTR size, the CPU 201 displays a screen 1001 shown in FIG. 10A on the display unit 206. At this time, a paper size for which a paper-out error has occurred is displayed in a display 1002, and a manual feed button 1003 is displayed in grayout to inhibit the user from selecting it. On the other hand, if the paper size is LGL size, the CPU 201 displays a screen 1004 shown in FIG. 10B on the display unit 206. At this time, a paper size for which a paper-out error has occurred is displayed in a display 1005, and a manual feed button 1006 is displayed in grayout to inhibit the user from selecting it.

When the screen 1001 or 1004 shown in FIG. 10 is displayed, the user sets paper sheets that have run out due to a paper-out error are set on the manual feed tray 304. That is, the user sets paper sheets with LTR size on the manual feed tray 304 if the screen 1001 is displayed, or the user sets paper sheets with LGL size on the manual feed tray 304 if the screen 1004 is displayed. In step S1111, the CPU 201 uses the sensor 404 to detect that paper sheets are set on the manual feed tray 304 by the user.

In step S1112, the CPU 201 automatically sets, for the manual feed tray 304, a paper size for which a paper-out error has occurred in step S1110. In step S1113, the CPU 201 sets, for the manual feed tray 304, a paper type corresponding to the paper size for which a paper-out error has occurred in step S1110. In step S1114, the CPU 201 uses the printer 204 to restart printing, and advances the process to step S1115. In step S1115, the CPU 201 determines whether the printing ends, and if so, it ends the processing shown in FIG. 11; otherwise, it advances the process to step S1110.

With this arrangement, even when a paper-out condition for paper sheets necessary for an applied function has occurred, the paper size of paper sheets in a paper-out condition is automatically set for the manual feed tray 304, so the user's burden of the setting operation can be reduced.

[Second Embodiment]
[Example of Image Forming Apparatus Including Two or More Cassette Trays and Manual Feed Tray]

Figure 14:
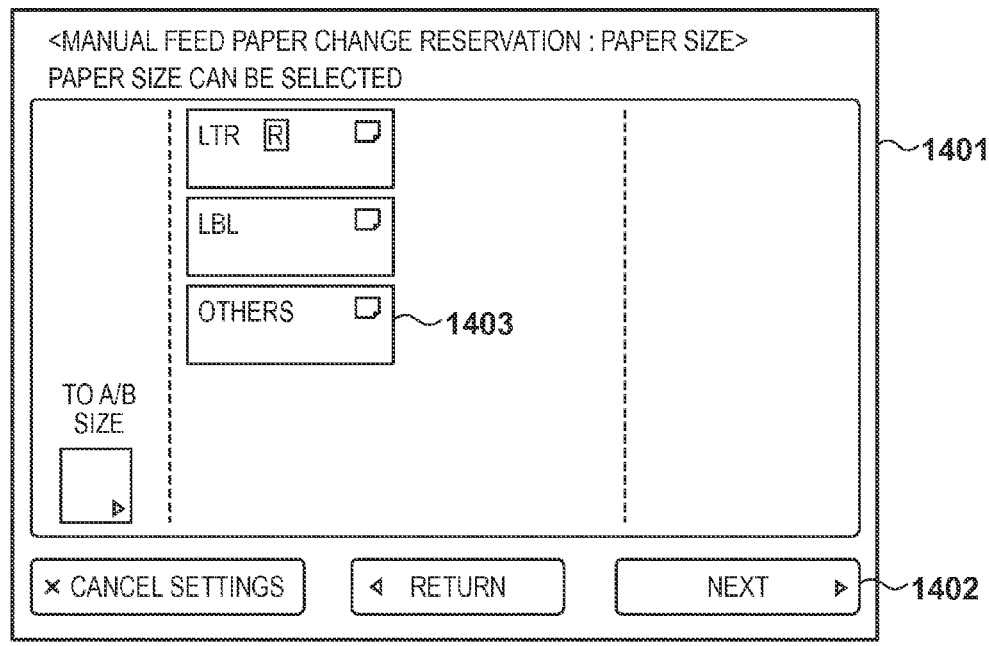
FIG. 14 is a view showing a screen for displaying a paper selection list.

Processing of narrowing down manual feed paper sizes when the mixed LTR/LGL function is set in the image forming apparatus 100 including the two or more cassette trays 305 and manual feed tray 304 will be described below with reference to FIGS. 14 and 15.

Figure 15:
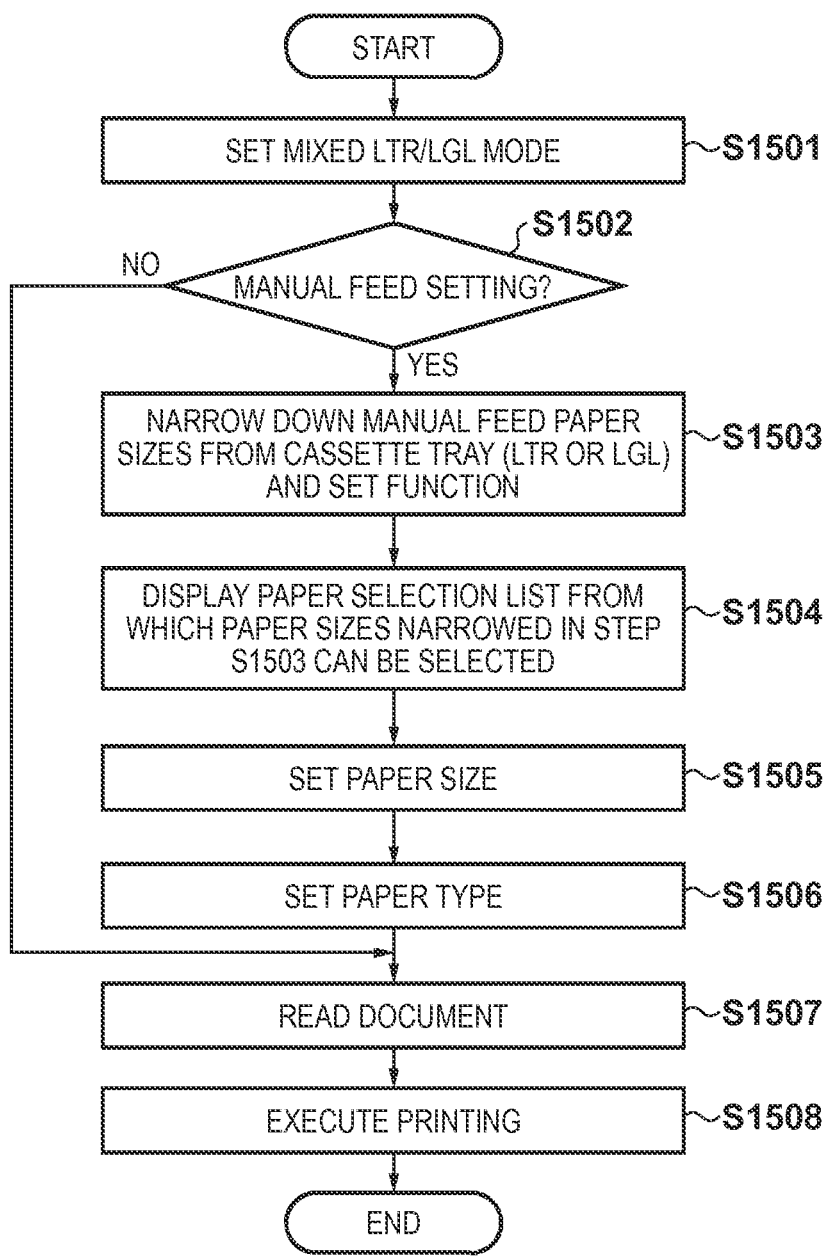
FIG. 15 is a flowchart showing the procedure of processing of specifying a manual feed paper size in the second embodiment.

FIG. 15 is a flowchart showing the procedure of processing of narrowing down manual feed paper sizes when paper sheets with both LTR and LGL sizes are set on the cassette tray 305. The processing shown in FIG. 15 is executed by, for example, the CPU 201. In step S1501, as in step S901 of FIG. 9, the CPU 201 accepts the settings of the mixed LTR/LGL function by the user via the display unit 206 or PC 107. In step S1502, the CPU 201 determines whether the use of the manual feed tray 304 is set. If the CPU 201 determines that the use of the manual feed tray 304 is set, it advances the process to step S1503; otherwise, it advances the process to step S1507, in which it starts to read a document.

In step S1503, the CPU 201 narrows down a paper size (LTR or LGL size), that can be used for the manual feed tray 304, from the paper size already set for the cassette tray 305, and the acceptance result of the settings of the mixed LTR/LGL function in step S1501. In this embodiment, paper sheets with both LTR and LGL sizes are set on the cassette tray 305. Note that either LTR or LGL size can be set as a paper size that can be set for the manual feed tray 304. In step S1504, the CPU 201 displays the paper size specified in step S1503 on the display unit 206, as shown in FIG. 14, as a selectable paper selection list. The CPU 201 displays both LTR and LGL sizes as a selectable paper list, and does not display paper sheets with other sizes, as shown in FIG. 14. This is because the use of the mixed LTR/LGL function is set, so a paper size set for the manual feed tray is narrowed down to one of LTR and LGL sizes. However, in this example, paper sheets with both LTR and LGL sizes are set on the cassette tray 305, so paper sizes are not narrowed down to one of LTR and LGL sizes. The user can designate, on a paper size selection screen 1401 shown in FIG. 14, a paper size to be set for the manual feed tray 304. Also, as the user presses an "Others" button 1403 on the paper size selection screen 1401, a shift to a paper size list excluded from the paper selection list can be made. When the user presses a "Next" button 1402 in step S1504, the CPU 201 advances the process to step S1505.

In step S1505, the CPU 201 displays the paper type change screen 507, and sets, for the manual feed tray 304, the paper size selected by the user from the paper selection list displayed in step S1504. In step S1506, the CPU 201 sets, for the manual feed tray 304, the sheet type designated by the user on the paper type change screen 507. In step S1507, the CPU 201 acquires image data from the scanner 205 or PC 107. In step S1508, the CPU 201 uses the printer 204 to start execution of printing based on the acquired image data.

[Case wherein Paper-out Condition Has Occurred]

Figure 16:
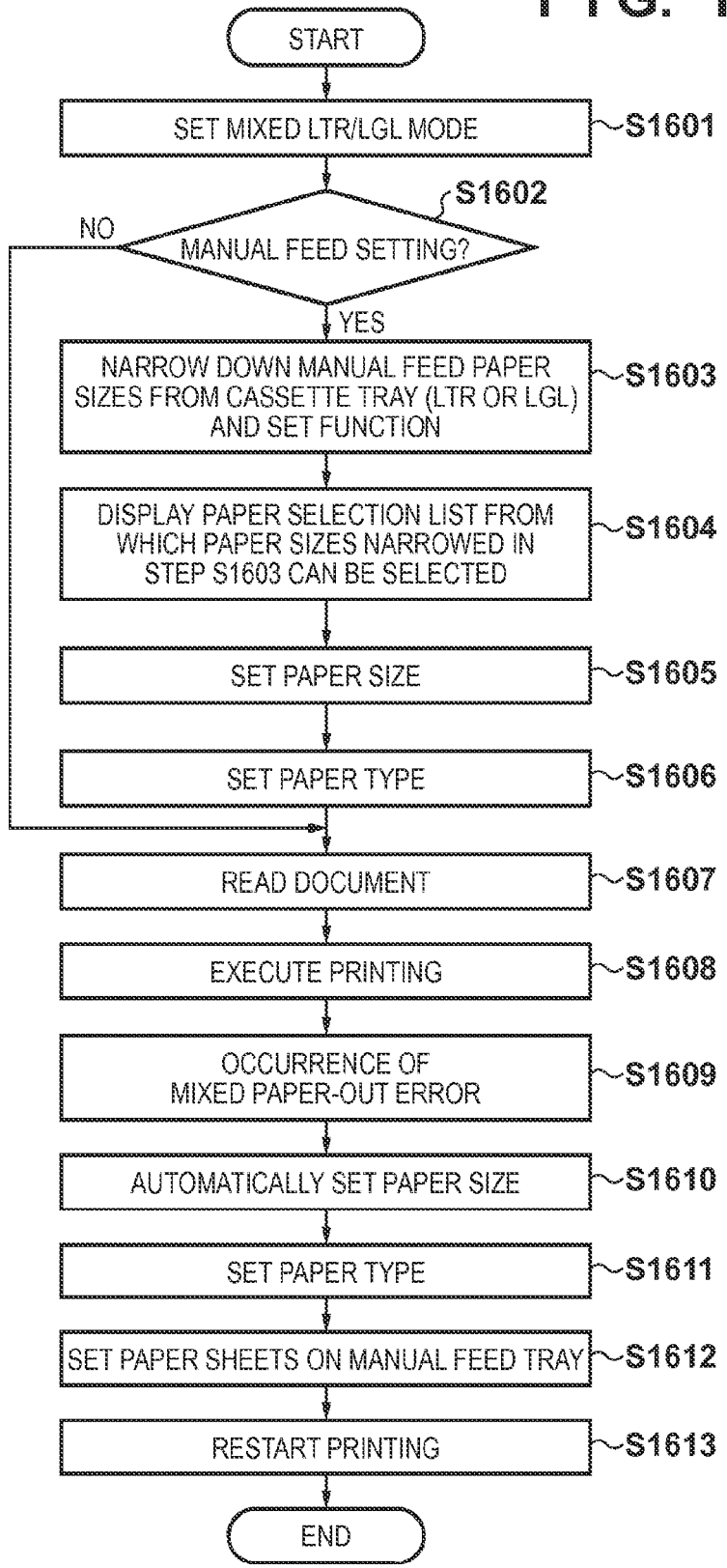
FIG. 16 is a flowchart showing the procedure of processing of specifying a manual feed paper size in a paper-out condition.

Processing of narrowing down manual feed paper sizes when paper sheets with LTR or LGL size on the cassette tray 305 have run out will be described below with reference to FIGS. 14 and 16. The processing shown in FIG. 16 is executed by, for example, the CPU 201. Steps S1601 to S1608 are the same as in steps S1501 to S1508, respectively.

In step S1609, the CPU 201 performs the following control when it is determined in step S1602 that the use of the manual feed tray 304 is not set. If the CPU 201 detects that paper sheets with LTR or LGL size necessary for the mixed LTR/LGL function are not set on the cassette tray 305, it interrupts the printing, and displays a paper-out error on the display unit 206. In step S1610, the CPU 201 displays a screen for setting which paper size for which it is detected in step S1609 that specific paper sheets are not set is to be set on the manual feed tray 304. At this time, a screen as shown in FIG. 14 is displayed.

In step S1611, the CPU 201 sets, for the manual feed tray 304, a paper type corresponding to the paper size for which it is detected in step S1609 that specific paper sheets are not set. In step S1612, the CPU 201 uses the sensor 404 to detect that paper sheets are set on the manual feed tray 304 by the user. In step S1613, the CPU 201 uses the printer 204 to restart printing.

With this arrangement, even when a paper-out condition for paper sheets necessary for an applied function has occurred, the paper size of paper sheets in a paper-out condition is automatically set for the manual feed tray 304, so the user's burden of the setting operation can be reduced.

[Third Embodiment]

An operation when a rotary sorting function is set in an image forming apparatus 100 including two or more cassette trays 305 and a manual feed tray 304 will be described below. The rotary sorting function is one of the applied functions of the image forming apparatus 100, and is used to alternately print on H and R paper sheets for each copy. Note that the H paper sheet means a portrait paper sheet, that is, a paper sheet conveyed so that the long side of a paper sheet becomes the leading edge in the conveyance direction. Also, the R paper sheet means a landscape paper sheet, that is, a paper sheet conveyed so that the short side of a paper sheet becomes the leading edge in the conveyance direction.

Processing of narrowing down paper sizes to be set for the manual feed tray 304 when only H or R paper sheets are set on the cassette tray 305 will be described below with reference to FIGS. 17A, 17B, and 18.

Figure 19:
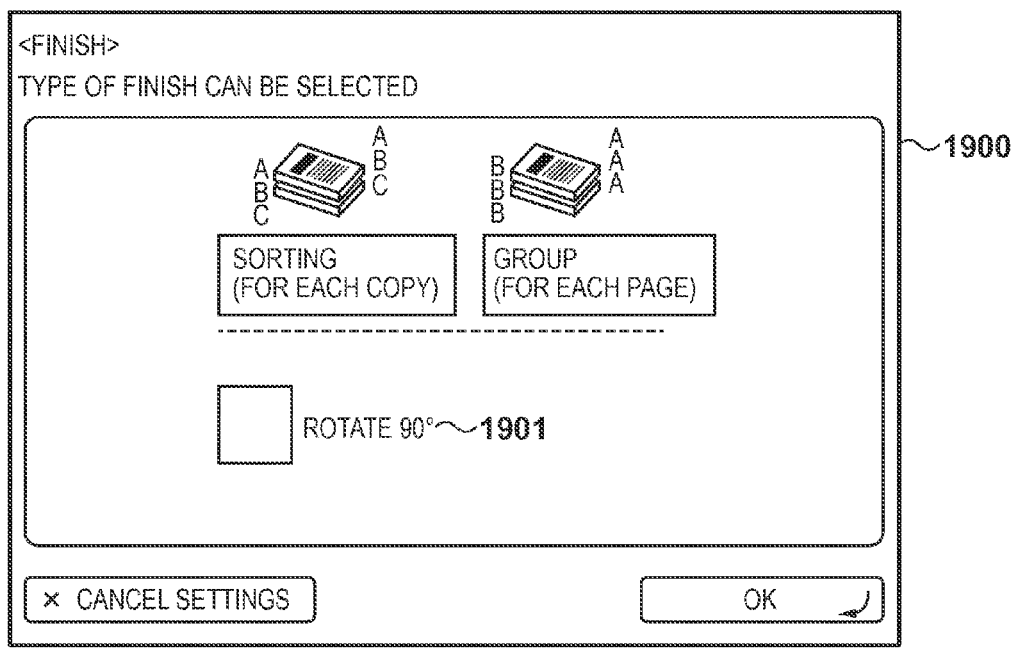
FIG. 19 is a view showing a setting screen for a rotary sorting function.
Figure 20:
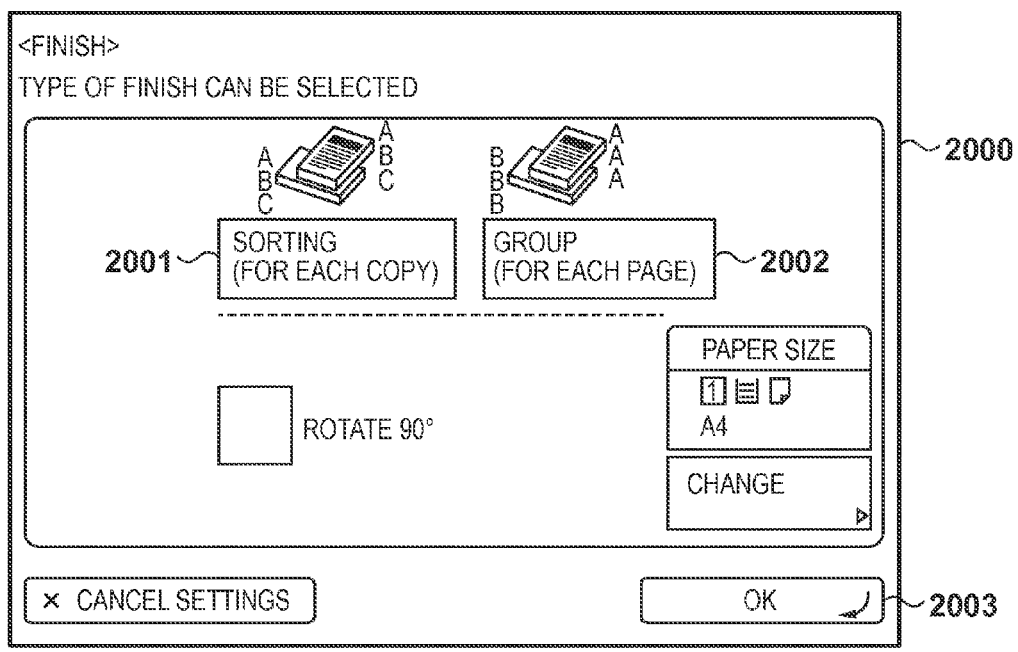
FIG. 20 is a view showing a detailed setting screen for the rotary sorting function.

In step S1801, a CPU 201 accepts the settings of the rotary sorting function by the user via a display unit 206 or a PC 107. An example of step S1801 will be described herein. The user presses a 90-degree rotation button 1901 on a setting screen 1900 for the rotary sorting function, as shown in FIG. 19. Since the rotary sorting function itself is a general function, the setting screen 1900 can be displayed from a detailed setting screen with a general copy function displayed on a display in, for example, an MFP. When the 90-degree rotation button 1901 is pressed, a setting screen 2000 for the rotary sorting function, shown in FIG. 20, is further displayed. The user selects, on the setting screen 2000, rotary sorting for each copy or that for each page. As the user selects a button 2001 or 2002, and presses an "OK" button 2003, the CPU 201 can accept the settings of the rotary sorting function. Note that it may be possible to selectively set the use of the manual feed tray 304 via, for example, a button on the setting screen 2000. In the following description, the use of the manual feed tray 304 is assumed to be set.

In step S1802, the CPU 201 determines whether the use of the manual feed tray 304 is set. If the CPU 201 determines that the use of the manual feed tray 304 is set, it advances the process to step S1803; otherwise, it advances the process to step S1807, in which it starts to read a document.

In step S1803, the CPU 201 narrows down and specifies paper sheets (H or R paper sheets), that can be used for the manual feed tray 304, from the paper size already set for the cassette tray 305, and the acceptance result of the settings of the rotary sorting function in step S1801. In this embodiment, H or R paper sheets can be set on the cassette tray 305. Also, either H or R paper sheets can be set on the manual feed tray 304. However, if, for example, R paper sheets are set on the cassette tray 305, a paper selection screen 1703 is displayed. If, for example, R paper sheets are set on the cassette tray 305, a paper selection screen 1701 is displayed. H paper sheets such as "A4", "A5", and "B5" paper sheets are displayed on the paper selection screen as a selectable paper selection list. On the other hand, if H paper sheets are set on the cassette tray 305, the paper selection screen 1701 is displayed. R paper sheets such as "A4R" and "A5R" paper sheets are displayed on the paper selection screen as a paper selection list. With this operation, in step S1804, the CPU 201 displays the paper size specified in step S1803 on the display unit 206 as a selectable paper selection list. The user can designate, on the paper selection screen 1701 or 1703 shown in FIGS. 17A and 17B, paper sheets to be set on the manual feed tray 304. Also, as the user presses an "Others" button 1705 on the paper selection screen 1701 or 1703, a shift to a paper size list excluded from the paper selection list can be made. When the user presses a "Next" button 1702 or 1704 in step S1804, the CPU 201 advances the process to step S1805.

In step S1805, the CPU 201 displays a paper type change screen 507, and sets, for the manual feed tray 304, a paper size designated by the user from the paper selection list displayed in step S1804. In step S1806, the CPU 201 sets, for the manual feed tray 304, the paper type designated by the user on the paper type change screen 507. In step S1807, the CPU 201 acquires image data from a scanner 205 or the PC 107. In step S1808, the CPU 201 uses a printer 204 to start execution of printing based on the acquired image data. The CPU 201 advances the process to step S1809.

In step S1809, the CPU 201 determines whether a paper-out condition is set, based on whether it is detected on the cassette tray 305 that paper sheets with a size necessary for the rotary sorting function have run out. If the CPU 201 determines that a paper-out condition is set, it interrupts the current printing, displays a paper-out error on the display unit 206, and advances the process to step S1810. On the other hand, if the CPU 201 determines that a paper-out condition is not set, it directly continues the printing, and advances the process to step S1814. In step S1810, the CPU 201 detects that paper sheets are set on the manual feed tray 304 by the user.

In step S1811, the CPU 201 automatically sets, for the manual feed tray 304, a paper size for which a paper-out error has occurred in step S1809. In step S1812, the CPU 201 sets, for the manual feed tray 304, a paper type corresponding to the paper size for which a paper-out error has occurred in step S1110. In step S1813, the CPU 201 uses the printer 204 to restart printing, and advances the process to step S1814. In step S1814, the CPU 201 determines whether the printing ends, and if so, it ends the processing shown in FIG. 18; otherwise, it advances the process to step S1809.

With this arrangement, when printing is executed using a rotary sorting function of alternately printing on H and R paper sheets, paper sheets in an orientation that is not set for the cassette tray are set for the manual feed tray as a settable candidate. This makes it possible to reduce the user's burden of the setting operation.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183584, filed Aug. 22, 2012, which is hereby incorporated by reference herein in its entirety.

What is claimed is:

1. A printing apparatus including a manual feed tray and a cassette tray, the apparatus comprising:
   an instruction accepting unit configured to accept a print instruction for performing printing by using the manual feed tray and the cassette tray;
   a specifying unit configured to specify a paper size which is to be set for the manual feed tray, based on a paper size which is set for the cassette tray, in a case where the print instruction is accepted by said instruction accepting unit; and
   a setting unit configured to set, for the manual feed tray, the paper size specified by said specifying unit; and
   a printing unit configured to perform printing by using the manual feed tray and the cassette tray.

2. The apparatus according to claim 1, wherein said specifying unit further comprises:
   a display control unit configured to display, on a display unit, a list of a plurality of paper sizes that can be set for the manual feed tray, based on the paper size which is set for the cassette tray; and
   a selection accepting unit configured to select a paper size from the list,
   wherein said specifying unit specifies the selected paper size, as a paper size which is to be set for the manual feed tray.

3. The apparatus according to claim 1, further comprising:
   a reading unit configured to optically read a bundle of documents including documents with a plurality of paper sizes to generate read data,
   wherein the print instruction is for performing printing based on the read data.

4. The apparatus according to claim 1, wherein the paper size is a length of a side of a paper corresponding to a leading edge of the paper in a conveyance direction thereof.

5. The apparatus according to claim 1, wherein the paper size, specified by said specifying unit, which is to be set for the manual feed tray is different from the paper size which is set for the cassette tray.

6. A printing apparatus including a manual feed tray, and a cassette tray, the apparatus comprising:
   an instruction accepting unit configured to accept a print an instruction for performing printing by using the manual feed tray and the cassette tray;
   a printing unit configured to perform printing by using the manual feed tray and the cassette tray, in a case where the print instruction is accepted by said instruction accepting unit;
   a printing control unit configured to detect a paper-out condition and interrupt the printing; and
   a setting unit configured to set, for the manual feed tray, a paper size set for a cassette tray for which the paper-out condition is detected.

7. The apparatus according to claim 6, further comprising:
   a detection unit configured to detect that a paper is placed on the manual feed tray,
   wherein said printing control unit restarts the interrupted printing as said detection unit detects placement of a paper with the paper size set by said setting unit.

8. A printing method executed by a printing apparatus including a manual feed tray and a cassette tray, the method comprising:
   an instruction accepting step of accepting a print instruction for performing printing by using the manual feed tray and the cassette tray;
   a specifying step of specifying a paper size which is to be set for the manual feed tray, based on a paper size which is set for the cassette tray, in a case where the print instruction is accepted in the instruction accepting step; and
   a setting step of setting, for the manual feed tray, the paper size specified in the specifying step; and
   a printing step of performing printing by using the manual feed tray and the cassette tray.

9. A printing method executed by a printing apparatus including a manual feed tray and a cassette tray, the method comprising:
   an instruction accepting step of accepting a print instruction for performing printing by using the manual feed tray and the cassette tray;
   a printing step of performing printing by using the manual feed tray and the cassette tray, in a case where the print instruction is accepted in the instruction accepting step;

a printing control step of detecting a paper-out condition and interrupt the printing; and a setting step of setting, for the manual feed tray, a paper size set for a cassette tray for which the paper-out condition is detected.

* * * * *